Sept. 25, 1934.   T. A. WEINKE   1,974,635
HOSE COUPLING
Filed July 31, 1933   2 Sheets-Sheet 1

Inventor
Theodore A. Weinke
By
Attorney

Sept. 25, 1934.  T. A. WEINKE  1,974,635
HOSE COUPLING
Filed July 31, 1933  2 Sheets-Sheet 2
Fig. 4.
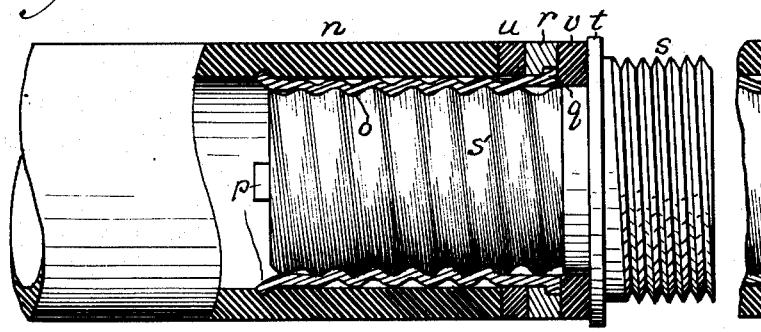
Fig. 8.
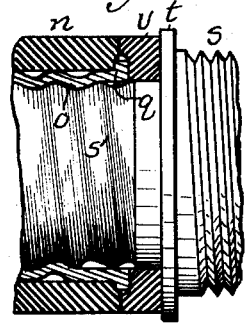
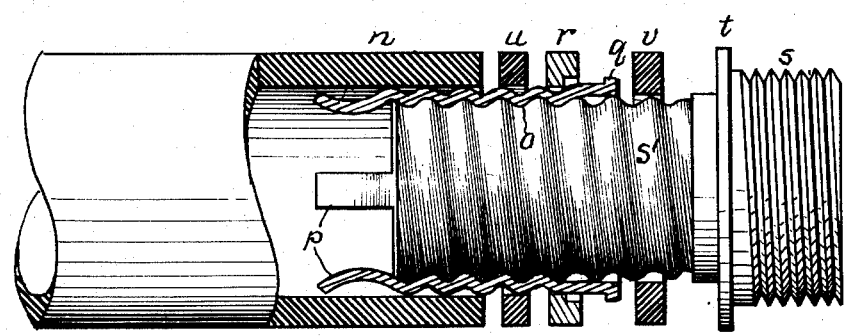
Fig. 5.
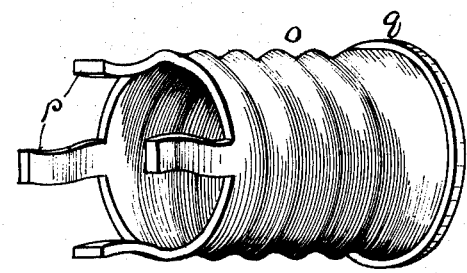
Fig. 6.
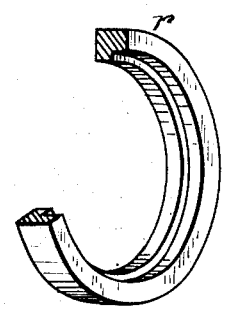
Fig. 7.
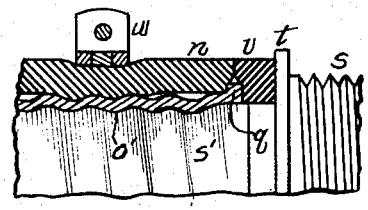
Fig. 9.
Inventor:
Theodore A. Weinke
by H. Geisler
Atty.

Patented Sept. 25, 1934

1,974,635

UNITED STATES PATENT OFFICE 1,974,635

HOSE COUPLING

Theodore A. Weinke, Portland, Oreg.

Application July 31, 1933, Serial No. 683,233

7 Claims. (Cl. 285—75)

My invention relates to garden hose couplings of the type which consists of metal male and female threaded sections, provided with nipples adapted to be inserted in the hose ends to be coupled, and the coupling being made by screwing said coupling sections together.

The objection to couplings of this type is the difficulty, if not the practical impossibility of so fastening the respective coupling sections in the hose ends as to prevent the pressure of the water delivered thru the hose from escaping from one of the hose ends over the nipple of the coupling section, thus not only reducing the ejected stream of water in column and velocity, but the water escaping from the hose connection is apt to be projected on the person using the hose.

The reason for such escape of water from the hose coupling is, it is not practicable to obtain a water-tight contact between the hose end and the nipple of the coupling section, no matter how firmly the hose end may be clamped on the nipple.

The object of my invention is to provide a coupling of the character mentioned, by which the escape of water at the coupling is effectively prevented.

The major principle of construction and operation of my invention consists in inserting in the hose end and securing therein against longitudinal and rotary movement, a threaded thimble to receive the nipple of a hose coupling section, and introducing between the latter and the rim of the hose end, means including a gasket or washer element to prevent escape of water between the hose end and the coupling.

Such principle may be carried into practice in two different modes, both of which are illustrated in the accompanying drawings and hereinafter fully described.

In the drawings:

Figs. 4 to 7 illustrate another embodiment; thus

Fig. 1 shows a hose end in which a male hose coupling is being inserted, and illustrates the construction and operation of my coupling;

Fig. 2 shows the insertion of the coupling section in the hose end; the coupling section being female instead of male;

Fig. 3 shows in perspective one of the thimbles constituting one of the elements of my coupling inserted and locked in place in the hose end;

Fig. 4 shows a hose end in which a male coupling is inserted and rendered water tight by the second mode of carrying my device into practice;

Fig. 5 shows the elements of the same coupling separated from each other;

Fig. 6 shows in perspective the thimble section of my hose coupling;

Fig. 7 shows a sectional perspective of the flange ring section provided on the outer end of said thimble section;

Fig. 8 shows a possible simplification of the said construction of my hose coupling; and Fig. 9 illustrates a possible variation in the means for securing the thimble section of my coupling in the hose end against movement.

Figure 1:
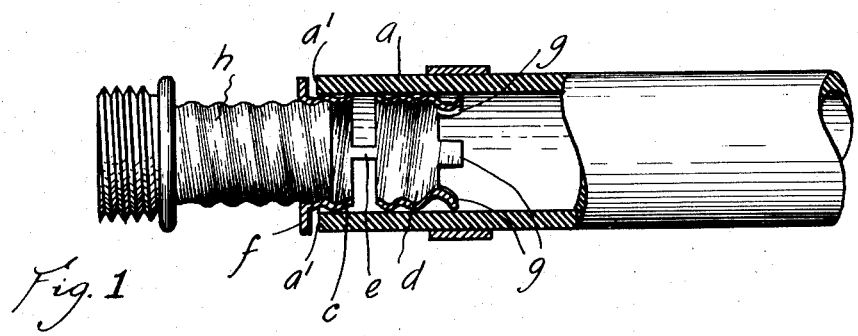
Figs. 1 to 3 illustrate one construction of my hose coupling.
Figure 2:
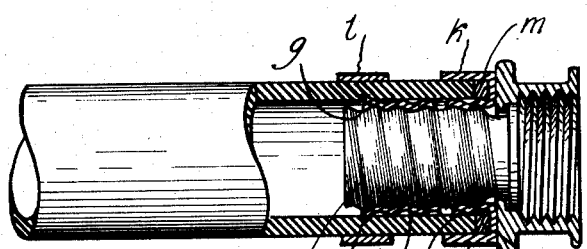
Figure 3:
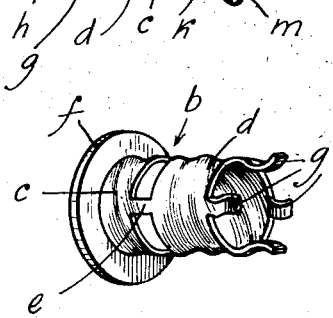

Describing first the construction of my invention as shown by Figs. 1 to 3, inclusive:

In each of the hose ends as $a$ to be coupled is inserted the thimble element $b$ of my coupling. The wall of this thimble consists of outer and inner spaced sections $c$, $d$ united by frangible connections $e$, and the inner section $d$ must be threaded. The extremity of the outer section $c$ is provided with a flange $f$ and the extremity of the inner section $d$ is provided with radially disposed expansible prongs $g$ initially lying within the circumference of the thimble. The coupling section, whether male or female, consists of a nipple $h$ adapted to be threaded into the inner thimble section $d$ and provided with a flange $i$. The thimble $b$ is first inserted in the hose end, with its flange $f$ in close abutment with the hose end. Then the nipple $h$ will be threaded into the thimble, in which operation the prongs $g$ of the thimble $b$ will be spread outward and caused to become firmly engaged with the interior of the wall of the hose end as illustrated in Fig. 2.

The nipple $h$ of the coupling section is made of such length that after it has entered the inner section $d$ of the thimble $b$ and has spread the prongs $g$ apart so as to become engaged with the hose end, as mentioned, there will still remain a portion of the nipple $h$ projecting outward of the flange $f$ of the thimble $b$. The threading of the nipple of the coupling section into the thimble projects the latter's prongs $g$ into the wall of the hose end and thus secures said inner thimble section $d$ against movement, either longitudinal or rotary. The frangible connections $e$ between the outer and inner sections $c$, $d$ of the thimble are adapted to permit the further movement of the outer thimble section $c$ into the hose end, either by rupture of said frangible connections or their distortion after the inner thimble section $d$ is held in place.

Thus by completing the threading of the nipple $h$ into the thimble $b$, the pressure brought to bear on the frangible connections $e$ of the thimble sections c and d will cause such connections to break, or to yield to distortion; and thus the complete threading of the nipple h into the thimble b will cause the flange f of the thimble section to bear so firmly against the hose end a' as to effect a water-tight joint with it.

In consequence, the complete threading of the nipple h of the coupling section into the thimble b finally causes the flange f of the latter to bear so firmly against the hose end as to assure a water-tight joint.

In order further to assure a water-tight connection between the flange f of the thimble and the hose end a' as mentioned, a washer m of yielding material, preferably also having cementitious surfaces, may be inserted between the flange f of the thimble and the hose end as shown by Fig. 2.

In order to provide further assurance for forming said water-tight joint, the flange f of the thimble may be cupped as shown by k in Fig. 2, so that as the parts are drawn together said cupped flange portion k will restrain the spreading outward of the hose end under the pressure of the flange f of the thimble against it.

In order to restrain the outward yield of the hose wall when under the pressure of the prongs g of the inner section d of the thimble, a clamping ring, as l, see Fig. 2, or other band-like means, may be employed.

Preferably a washer, not shown, is inserted between the flange i of the coupling section h and the flange f of the thimble, since such assures the best water-tight fitting.

In the construction of my coupling, shown by Figs. 4 to 7 inclusive, the end of the hose n has inserted in it a thimble o, provided at its inner end with expansible prongs p, and provided at its outer end with a flange q. (A perspective view of this thimble is shown by Fig. 6.)

This flange preferably is made narrow and engages with a flange ring r. A perspective of this flange ring is shown by Fig. 7.

In the thimble o is threaded the nipple s' of the coupling section s provided with a flange t. Before threading the nipple of the coupling s into the thimble o, a rubber washer u is placed under the flange ring r. The thimble is in the first instance inserted its full length into the hose-end n, so as to bring the flange ring r as tightly as possible against the washer u, and the latter against the rim of the hose end. By then screwing in the nipple s' of the hose coupling section s into the thimble o, the prongs p at the inner end of the latter are expanded outwardly, and caused to engage with the wall of the hose end, as illustrated in Fig. 4. At the same time the flange t of the hose coupling section s is caused to bear firmly on the washer v placed under the flange ring r; and the latter then bears firmly on the washer u which in turn bears firmly against the rim of the hose end, thereby providing the desired water-tight joint for my hose coupling.

A possible simplification of the second construction of my hose coupling is illustrated by Fig. 8. The washer u and flange ring r, included in the construction shown by Figs. 4 and 5 of my drawings, may be omitted, and the washer v will then be brought into firm contact with the rim of the hose end over the flange q of the nipple s' and form a water-tight joint therewith.

Instead of providing the inner end of the thimble o with prongs as p, the latter may be omitted, if preferred, in order to simplify the construction; and instead the thimble may be secured against longitudinal or rotary movement, by the customary clamp represented by w in Fig. 9; thereby compressing the hose-end n firmly on the nipple o'. The remainder of the construction of my coupling may be as shown by Fig. 9, or as shown by Figs. 4 and 5.

The flange q of the thimble section of my hose coupling may also possibly be omitted for simplification. The described modification of my hose coupling must be left to the judgment of the manufacturer; taking into consideration dependability as the main factor.

While I have described my invention as a coupling for garden hose, this is merely one of its uses and many further uses will suggest themselves.

Without limiting myself to the precise details above described, what I claim is:

1. In a hose coupling the combination of a thimble adapted to be inserted in the hose end, said thimble comprising inner and outer spaced sections, the inner section being threaded, said sections joined by a yielding connection accommodating longitudinal movement of said outer section towards said inner section, said outer section provided with a flange, means for securing said inner section against displacement in the hose end, and a coupling section threading into said inner section having a nipple provided with a flange, whereby the threading of the coupling section into the thimble will move the outer section of the thimble inward, and therewith its flange against the hose end.

2. In a hose coupling the combination of a thimble adapted to be inserted in the hose end, said thimble comprising inner and outer spaced sections, the inner section being threaded, said sections joined by a yielding connection accommodating longitudinal movement of said outer section towards said inner section, said outer section provided with a flange, said inner section of the nipple provided with means expansible into locking engagement with the wall of a hose end, such means initially lying within the circumference of said thimble, and a coupling section threading into said inner section, having a nipple provided with a flange whereby the threading of the coupling section into the thimble will move the outer section of the thimble inward, and therewith its flange against the hose end.

3. The combination of claim 2 in which the expansible means for securing the inner section of the thimble against displacement in a hose end, consist of radially disposed prongs initially lying within the circumference of said thimble.

4. The combination of claim 2 including a collar clamped to said hose over said expansible locking means of the inner thimble section.

5. A hose coupling fixture comprising a thimble adapted to be inserted in a hose end, said thimble comprising inner and outer spaced sections, the inner section being threaded and said sections joined by a connection accommodating longitudinal movement of said outer section towards said inner section, said outer section provided with a flange, means for securing said inner thimble section against displacement in the hose end.

6. The combination of claim 5 in which said means for securing the inner thimble section against displacement in the hose end consists of radially expansible portions initially lying within the circumference of said thimble.

7. In a hose coupling the combination of a thimble adapted to be inserted in a hose end, the outer end of said thimble provided with a narrow flange, said thimble provided with means for securing it against longitudinal displacement in the hose end, a coupling section having a nipple threading into said thimble and provided with a flange the width of which is equal to the thickness of the wall of said hose end, a washer between the flange of the coupling section and the rim of the hose end, whereby upon threading the nipple of the coupling section firmly into the thimble, said washer and the hose end will be forced against each other over the rim of the thimble flange, and thus form a water tight joint between the coupling section and the hose end.

THEODORE A. WEINKE.